United States Patent
Finnerty et al.

(10) Patent No.: US 10,208,258 B2
(45) Date of Patent: Feb. 19, 2019

(54) ACTIVE FILTRATION SYSTEMS FOR HYDROCARBON FUELS, METHODS, AND FILTER ELEMENTS

(71) Applicant: WATT Fuel Cell Corp., Mount Pleasant, PA (US)

(72) Inventors: Caine Finnerty, Mount Pleasant, PA (US); Mathew Isenberg, Mount Pleasant, PA (US); Amanda Simson, Mount Pleasant, PA (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 104 days.

(21) Appl. No.: 15/122,318

(22) PCT Filed: Mar. 5, 2015

(86) PCT No.: PCT/US2015/018936
§ 371 (c)(1),
(2) Date: Aug. 29, 2016

(87) PCT Pub. No.: WO2015/134731
PCT Pub. Date: Sep. 11, 2015

(65) Prior Publication Data
US 2016/0369177 A1    Dec. 22, 2016

Related U.S. Application Data

(60) Provisional application No. 61/949,495, filed on Mar. 7, 2014.

(51) Int. Cl.
*B01D 15/34* (2006.01)
*C10G 31/09* (2006.01)
(Continued)

(52) U.S. Cl.
CPC ............ *C10G 31/09* (2013.01); *B01D 15/34* (2013.01); *C10G 25/003* (2013.01); *C10G 25/05* (2013.01);
(Continued)

(58) Field of Classification Search
None
See application file for complete search history.

(56) References Cited

U.S. PATENT DOCUMENTS 2,739,713 A    3/1956  Robinson
4,865,742 A    9/1989  Falletti
(Continued)

FOREIGN PATENT DOCUMENTS

EP    0131119 A1    1/1985

OTHER PUBLICATIONS

International Search Report (4 pages) and Written Opinion of the International Searching Authority (6 pages) for International Application No. PCT/US2015/018936.

*Primary Examiner* — Chester T Barry
(74) *Attorney, Agent, or Firm* — Goodwin Procter LLP

(57) ABSTRACT

Closed loop filtration systems and methods of the present teachings can provide liquid reformable fuels enriched in light end hydrocarbons and/or having reduced content of sulfur and/or other impurities. Such enriched liquid reformable fuels can be used in fuel cell systems having a vaporizer and hydrocarbon fuel reformer such that the fuel cell system can experience less deleterious impact on its components, for example, coking. Filter elements for use in the systems and methods also are provided.

19 Claims, 3 Drawing Sheets

(51) Int. Cl.
  *C10G 25/00*  (2006.01)
  *C10G 25/05*  (2006.01)
(52) U.S. Cl.
  CPC . *C10G 2300/202* (2013.01); *C10G 2300/205* (2013.01); *C10G 2400/08* (2013.01)

(56) References Cited

U.S. PATENT DOCUMENTS

| | | | |
|---|---|---|---|
| 5,332,424 A * | 7/1994 | Rao | B01D 53/226 62/624 |
| 5,897,779 A | 4/1999 | Wisted et al. | |
| 7,771,569 B2 * | 8/2010 | Yang | B01D 3/14 203/39 |
| 2003/0070990 A1 | 4/2003 | Rohrbach et al. | |
| 2005/0022449 A1 | 2/2005 | Katikaneni et al. | |
| 2010/0163456 A1 * | 7/2010 | Bause | C10G 25/003 208/250 |
| 2011/0062076 A1 | 3/2011 | Lee et al. | |

\* cited by examiner

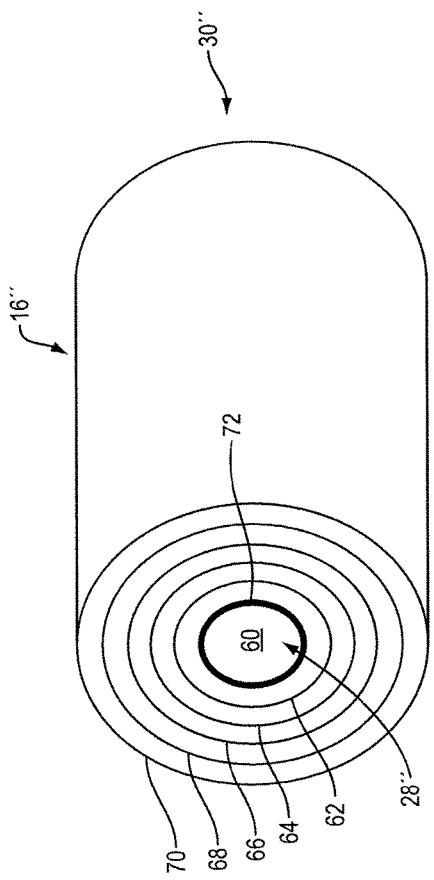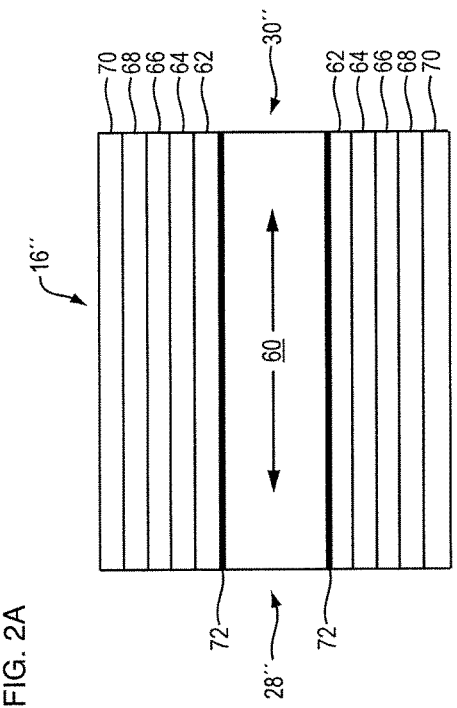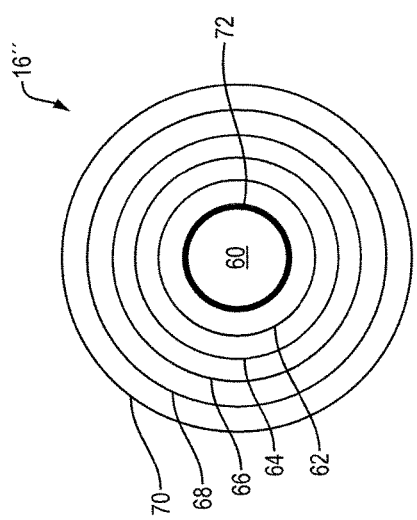

ACTIVE FILTRATION SYSTEMS FOR HYDROCARBON FUELS, METHODS, AND FILTER ELEMENTS

CROSS-REFERENCE TO RELATED APPLICATIONS

This application is a U.S. national stage application under 35 U.S.C. § 371 of International Application No. PCT/US2015/018936, filed on Mar. 5, 2015, which claims priority to and the benefit of U.S. Patent Application No. 61/949,495, filed on Mar. 7, 2014, each of which is incorporated by reference herein in its entirety for all purposes.

FIELD

The present teachings relate to active filtration systems for hydrocarbon fuels, methods of actively filtering hydrocarbon fuels, and filter elements in connection with the same. More particularly, the present teachings relate to a closed loop filtration system for separating and/or enriching the fraction of light end hydrocarbons from and/or in a mixture of hydrocarbons, methods for practicing the same, and filter elements for use in accordance with the present teachings.

BACKGROUND

The conversion of a gaseous reformable fuel and/or a liquid reformable fuel to a hydrogen-rich carbon monoxide-containing gas mixture, a product commonly referred to as "synthesis gas" or "syngas," can be carried out in accordance with any of such well known fuel reforming operations such as steam reforming, dry reforming, autothermal reforming, and catalytic partial oxidation reforming.

The development of improved fuel reformers, fuel reformer components, and reforming processes continues to be the focus of considerable research due to the potential of fuel cell systems or simply, "fuel cells," i.e., devices for the electrochemical conversion of electrochemically oxidizable fuels such as hydrogen, mixtures of hydrogen and carbon monoxide, for example, syngas, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) widely are believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as convertors of such fuels to electricity, and the integration of fuel reformers and fuel cells into more compact, reliable and efficient devices for the production of electrical energy.

With these considerations in mind, the provision and use of improved liquid reformable fuels for fuel cell applications has drawn attention. For example, the ability to provide a liquid reformable fuel to a vaporizer and subsequently a hydrocarbon reformer for conversion into a hydrogen-rich product for use by a fuel cell stack is desired, where the liquid reformable fuel is enriched with light end hydrocarbons (i.e., contains a greater percentage of light end hydrocarbons) and/or has a reduced sulfur content and/or a reduced content of other impurities. Thus, there is a need to improve systems for and methods of separating and/or filtering mixed reformable hydrocarbons such as jet fuels into a liquid reformable fuel enriched in light end hydrocarbons.

SUMMARY

In light of the foregoing, the present teachings provide closed loop filtration systems and methods that can permit continuous flow and filtration of mixed liquid hydrocarbon (reformable) fuels to provide a liquid reformable fuel product, i.e., a liquid reformable fuel enriched with (or having a greater percentage of) light end hydrocarbons and/or having a reduced content of sulfur and/or of other impurities. In various filtration systems and methods, light end hydrocarbons can be separated from heavy end hydrocarbons and other impurities such as sulfur. The present teachings permit the liquid reformable fuel product to be used soon after collection and/or to be stored for future use.

According to the present teachings, the content of a liquid reformable fuel product can be tailored for a particular application, for example, for use in a vaporizer and hydrocarbon fuel reformer coupled to a fuel cell system. To that end, the components of a filter element of the present teachings can be varied appropriately depending on the source and/or content of the (crude or starting) mixture of hydrocarbons to provide a liquid reformable fuel product having the desired characteristics and properties.

In addition, the filtration systems of the present teachings can have a compact design for practical, on-site use in the field or various other applications where the provision of liquid reformable fuels enriched in light end hydrocarbons and/or having reduced content of sulfur and/or other impurities is desired. Alternatively, the filtration systems of the present teachings can be designed as larger, stationary systems where large scale filtration is desired.

Thus, in one aspect, the present teachings provide closed loop filtration systems for separating and/or enriching light end hydrocarbons from and/or in a mixture of hydrocarbons, for example, in a mixture of liquid reformable fuels such as a jet fuel. A closed loop filtration system generally includes a reservoir to contain a mixture of hydrocarbons; a pump to circulate hydrocarbons through the system; a filter element, where the filter element includes an inlet for receiving a mixture of hydrocarbons from the reservoir, an outlet for returning circulating hydrocarbons to the reservoir, and layers of filtration media, where the layers of filtration media define a core channel through the filter element and at least one layer of the layers of filtration media includes a size exclusion material; a pressure sensor to determine the pressure of circulating hydrocarbons; a valve assembly, in operable communication with the pressure sensor, to control the flow of hydrocarbons circulating through the system; and a collection chamber in fluid communication with an exterior surface of the filter element, where the collection chamber includes an outlet for light end hydrocarbons.

In various embodiments, the reservoir can include an inlet and an outlet. The inlet of the reservoir can be in fluid communication with the outlet of the filter element. The outlet of the reservoir can be in fluid communication with the inlet of the filter element. In particular embodiments, the reservoir can include a mixture of hydrocarbons, where the mixture of hydrocarbons can include light end hydrocarbons and heavy end hydrocarbons. In certain embodiments, the mixture of hydrocarbons can be a jet fuel.

In some embodiments, the filtration system can include a first conduit. The first conduit can include an upstream end and a downstream end. The upstream end of the first conduit can be in fluid communication with the outlet of the reservoir. The downstream end of the first conduit can be in fluid communication with the inlet of the filter element. In certain embodiments, the filtration systems can include a second conduit. The second conduit can include an upstream end and a downstream end. The upstream end of the second conduit can be in fluid communication with the outlet of the filter element. The downstream end of the second conduit can be in fluid communication with the inlet of the reservoir.

In particular embodiments, a pump can circulate hydrocarbons from the reservoir through the first conduit, through the core channel of the filter element, and through the second conduit into the reservoir. In various embodiments, the valve assembly can include a proportional valve. In some embodiments, the filtration system can include a heater in thermal communication with the hydrocarbons, for example, the mixture of hydrocarbons and/or the circulating hydrocarbons.

In certain embodiments, a collection chamber can enclose a filter element. In particular embodiments, an outlet of the collection chamber can be in fluid communication with a vaporizer of a fuel cell system. The vaporizer can be in fluid communication with a hydrocarbon fuel reformer, which can be coupled to a fuel cell stack of a fuel cell system.

In another aspect, the present teachings provide methods of separating and/or enriching light end hydrocarbons from and/or in a mixture of hydrocarbons such as a mixture of liquid reformable fuels. The methods generally include circulating a mixture of hydrocarbons in a closed loop system. The closed loop system generally can include a filter element, where the filter element includes an inlet for receiving a mixture of hydrocarbons from a reservoir, an outlet for returning circulating hydrocarbons to the reservoir, and layers of filtration media, where at least one layer of the filtration media includes a size exclusion material. The layers of filtration media can define a core channel through the filter element whereby the mixture of hydrocarbons can circulate through the core channel and fractions of hydrocarbons including light end hydrocarbons can pass through the layers of filtration media. The methods can include collecting the liquid reformable fuel product that passes through and exits the layers of filtration media, where the liquid reformable fuel product is enriched in light end hydrocarbons compared to the (starting) mixture of hydrocarbons.

In various embodiments, the methods of the present teachings can include flowing the liquid reformable fuel product enriched in light end hydrocarbons to a vaporizer of a fuel cell system. In some embodiments, the methods can include reducing the content (or level) of at least one of sulfur and sulfur-containing compounds and metals in the mixture of hydrocarbons to provide a liquid reformable fuel product enriched in light end hydrocarbons and having a reduced content of sulfur (including sulfur-containing compounds) and/or metals compared to the starting mixture of hydrocarbons.

In yet another aspect, the present teachings provide a filter element for use in separating and/or enriching the light end hydrocarbons fractions from and/or in a mixture of hydrocarbons, for example, separating light end hydrocarbons from a mixture of hydrocarbons that includes heavy end hydrocarbons and/or other impurities such as sulfur. The filter element generally is for use in a closed loop filtration system, where pressure in the filtration system can facilitate movement of hydrocarbons through layers of filtration media of the filter element. At least one of the layers of filtration media includes a size exclusion material. Accordingly, the size exclusion material can be designed such that lighter end hydrocarbons in the mixture of hydrocarbons can pass through the filtration media and become enriched in light end hydrocarbons.

In addition, the layers of filtration media can include other components to reduce the content of or remove impurities such as sulfur, water, and metals such as heavy metals, alkali metals, and alkaline earth metals. For example, the layers of filtration media can include one or more of a wicking material, a size exclusion material, a high surface area carbon-based material such as activated carbon and/or carbon nanotubes, a metal removal component, a sulfur removal component, and a hydrophobic surface. A filter element can include concentric layers of filtration media that define a core channel (or hollow core) through the filter element. The core channel can include an inlet and an outlet whereby a mixture of hydrocarbons can flow through the filter element from the inlet to the outlet and primarily light end hydrocarbons can pass through the concentric layers of filtration media and be collected. The core can include a core support. The core can be tubular. A tubular filter element can include concentric layers of filtration media.

The foregoing as well as other features and advantages of the present teachings will be more fully understood from the following figures, description, examples, and claims.

DESCRIPTION OF DRAWING

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

FIGS. 2A-C are schematic diagrams of an embodiment of a filter element of the present teachings. FIG. 2A is a perspective view; FIG. 2B is a lateral cross-section view of the filter element depicted in FIG. 2A; and FIG. 2C is a plan view with a horizontal plane cutting through the center of the filter element of FIG. 2A.

DETAILED DESCRIPTION

Figure 1A:
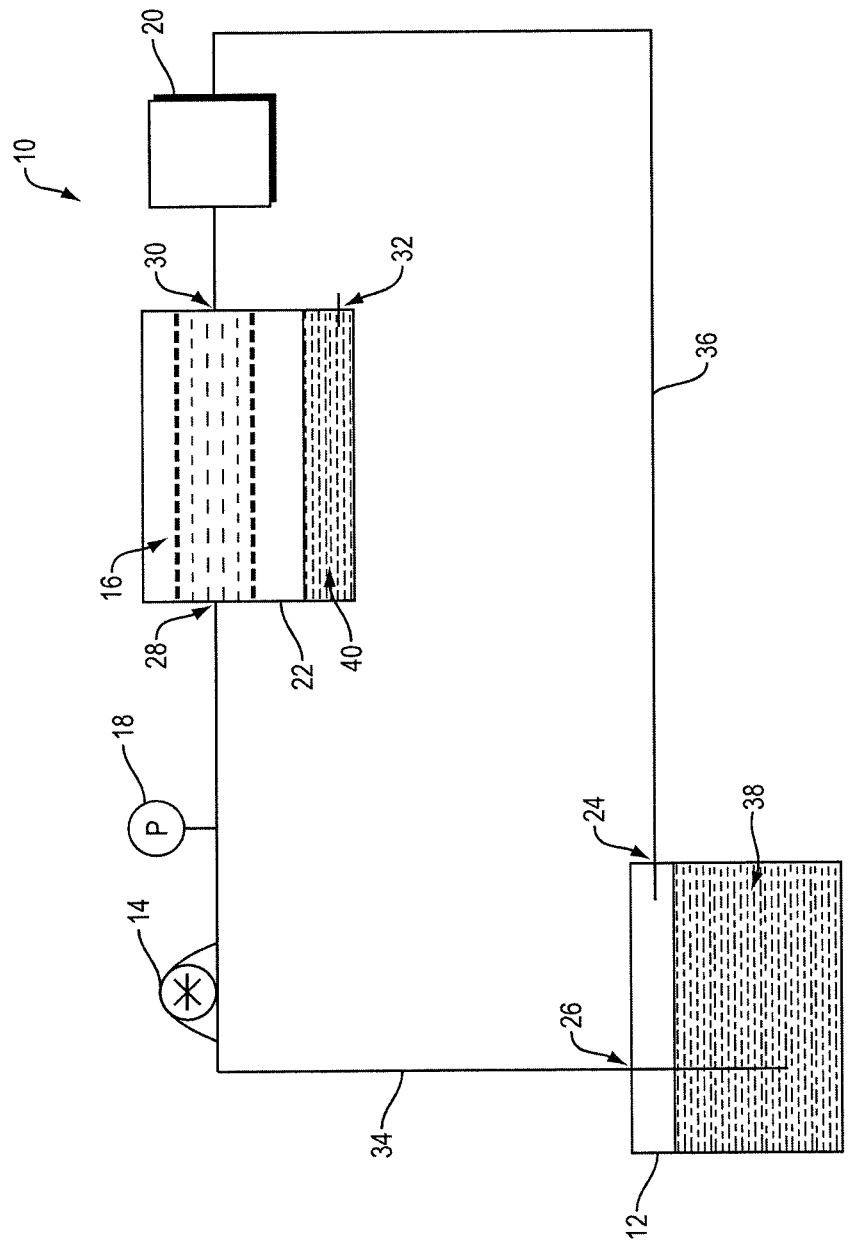
FIG. 1A is a schematic diagram of an embodiment of a closed loop filtration system of the present teachings.

It now has been discovered that closed loop filtration systems and methods of the present teachings can provide liquid reformable fuels enriched in light end hydrocarbons and/or having reduced content of sulfur and/or other impurities. Such enriched liquid reformable fuels, also referred to herein as a liquid reformable fuel product, can be used in fuel cell systems having a fuel reformer such that the fuel cell system can experience less deleterious impact on its components, for example, coking and/or poisoning of the catalytically-active metals.

The closed loop filtration systems and methods of the present teachings can be operated continuously to provide a steady state amount of liquid reformable fuel product for immediate use and/or for storage and later use. The closed loop filtration system has adjustable parameters such as temperature, flow rate, and pressure, which parameters can be modified for a particular application and/or desired end product, i.e., a liquid reformable fuel enriched in light end hydrocarbons and/or with a reduced content of sulfur and/or sulfur-containing compounds.

The closed loop filtration systems can be compact in design for use in the field where portable or mobile filtration systems can be needed. Alternatively, the closed loop filtration systems can be larger and stationary in design for large scale processing of mixtures of hydrocarbons.

Moreover, a filter element of the present teachings can be modified as appropriate depending on the source and content of the starting mixture of hydrocarbons and/or for a particular end application. For example, to provide a liquid reformable fuel product having a reduced sulfur content, in addition to reducing sulfur compounds present in the heavier end hydrocarbons, the filter element can include a sulfur removal component, such as copper, nickel, iron, their various oxides, and combinations thereof.

In certain embodiments, the starting mixture of hydrocarbons can be a jet fuel, for example, Jet Propellant 8 ("JP-8" or "JP8"). JP-8 is a kerosene-based fuel that is widely used by the military for a variety of applications. JP-8 is a mixture of hydrocarbons, where each hydrocarbon has an associated density and steric considerations. JP-8 also includes sulfur (e.g., sulfur-containing compounds) as well as being formulated with an icing inhibitor, corrosion inhibitors, lubricants, and antistatic agents. Accordingly, filtration of JP-8 before use in a fuel cell system can reduce the complications and deleterious impact that the sulfur-containing compounds, often found in heavy end hydrocarbon fractions, and other impurities can cause in a vaporizer, a hydrocarbon fuel reformer, and/or fuel cell system.

In various embodiments, the mixture of hydrocarbons can be a biofuel such as biodiesel. Because biodiesel tends to be less refined, use of an active filtration system of the present teachings can separate and/or filter light end hydrocarbons from the mixture and/or reduce the levels of undesired components such as heavy end hydrocarbons and/or sulfur-containing compounds.

It should be understood that the present teachings and general concepts discussed herein with respect to mixtures of hydrocarbons and hydrocarbon-based fuels can be applied to other fuels and mixtures where separation of compounds of various sizes, for example, varying atom chain lengths, and/or reduction or removal of impurities is desired. For example, treatment of bioethanol according to the present teachings can reduce or remove water and/or reduce or remove sulfur from the bioethanol, which can be desired for fuel cell and other applications.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein. For example, where reference is made herein to a particular structure such as a filter element, that structure can be used in various embodiments of apparatus of the present teachings such as a closed loop filtration system and/or in methods of the present teachings, unless otherwise understood from the context.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as," "including," or "for example," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," horizontal," "vertical," and the like, unless their contextual usage indicates otherwise, are to be understood herein as having no structural, functional or operational significance and as merely reflecting the arbitrarily chosen orientation of the various views of apparatus, devices, components, and/or features of the present teachings that may be illustrated in certain of the accompanying figures.

As used herein, "liquid reformable fuel" refers to and includes reformable carbon- and hydrogen-containing fuels that are a liquid at standard temperature and pressure ("STP") conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

As used herein, "light end hydrocarbons" refers to hydrocarbons having 14 or fewer carbon atoms forming the longest backbone of the compound. Examples of light end hydrocarbons that are a gas at STP conditions include methane, ethane, propane, butane, and isobutane. Examples of light end hydrocarbons that are a liquid at STP conditions include pentane, hexane, heptane, octane, nonane, decane, undecane, dodecane, tridecane, and tetradecane, including all isomers of each.

As used herein, "enriching" light end hydrocarbons in a mixture of hydrocarbons, including grammatical equivalents and equivalent expressions or language, is intended to encompass a process of creating a mixture of hydrocarbons where the light end hydrocarbons in the mixture has been increased, concentrated or otherwise made more abundant from its concentration or abundance in the original mixture of hydrocarbons. Similarly, a liquid reformable fuel or a liquid reformable fuel fraction "enriched" in or with light end hydrocarbons, including grammatical equivalents and equivalent expressions or language, is intended to encompass a mixture of hydrocarbons such as a liquid reformable fuel product where the light end hydrocarbons in the mixture has been increased, concentrated or otherwise made more abundant from its concentration or abundance in the original mixture of hydrocarbons. An enriched liquid reformable fuel such as an liquid reformable fuel product or an enriched fraction can result in a liquid reformable fuel or fraction where the presence of one or more light end hydrocarbons is at a concentration or abundance of greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 95%, greater than or equal to about 97%, or greater than or equal to about 99% or higher relative to its or their abundance or concentration in the original mixture of hydrocarbons.

As used herein, "reducing the content of" a compound or component of a mixture of hydrocarbons, including grammatical equivalents and equivalent expressions or language, is intended to encompass a process of creating a mixture of hydrocarbons where a compound or component in the mixture has been decreased, diluted or otherwise made less abundant from its concentration or abundance in the original mixture of hydrocarbons. Similarly, a mixture of hydrocarbons having a "reduced content of" of a compound or component, including grammatical equivalents and equivalent expressions or language, is intended to encompass a mixture of hydrocarbons where a compound or component in the mixture has been decreased, diluted or otherwise made less abundant from its concentration or abundance in the original mixture of hydrocarbons. A reduced content of a compound or component can result in a liquid reformable fuel such as a liquid reformable fuel product or fraction where the presence of one or more compounds or components is at a concentration or abundance of less than or equal to about 98%, less than or equal to about 95%, less than or equal to about 93%, less than or equal to about 90%, less than or equal to about 85%, less than or equal to about 80%, less than or equal to about 70%, less than or equal to about 60%, less than or equal to about 50%, less than or equal to about 40%, less than or equal to about 30%, less than or equal to about 20%, or less than or equal to about 10% or less relative to its or their abundance or concentration in the original mixture of hydrocarbons.

A used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly.

As used herein, to "control the flow" and "adjust the flow" of a fluid, including grammatical equivalents and equivalent expressions and language, can be to increase the flow of fluid, to decrease the flow of fluid, to maintain a substantially constant flow of fluid, and/or to interrupt or cease the flow of fluid. Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust the pressure."

As used herein, a "size exclusion material" refers to traditional or conventional size exclusion media, for example, that can be used in chromatographic applications such as size exclusion chromatography. However, a size exclusion material also can refer to any material having a porosity that provides a steric barrier, which can be a steric diffusion barrier. The size exclusion material should be stable to the chemical environment in which it used. As such, a size exclusion material can include particles such as activated carbon, alumina and/or carbon nanotubes, fused particles such as a monolith and other three-dimensional porous structures, a porous membrane, a porous film, and a sheet of porous material that can separate components based on size and/or steric hinderance. Accordingly, a size exclusion material can include a molecular sieve such as a zeolite, which is a macroporous, aluminosilicate mineral. Molecular sieve materials such as zeolites typically have a regular pore structure of molecular dimensions. Consequently, a molecular sieve, for example, a zeolite, with an appropriately dimensioned pore size can be used to separate or partition compounds based on their size.

As used herein, a "valve assembly" refers to a structure that can control fluid communication and fluid flow characteristics between or among components and/or structure, for example, the flow of a mixture of hydrocarbons from a reservoir through a filter element and back to the reservoir. A valve assembly can be a pressure metering assembly. A valve assembly can include a proportional valve; a series of proportional valves; an on/off valve such as a solenoid valve; a series of on/off valves, for example, a series of on/off solenoid valves; a three-way valve; a series of three-way valves; a check valve; a series of check valves; an orifice; a series of orifices; and combinations thereof, which can be in series. Where the components are indicated as being in series, the components can be either in a parallel series or in a sequential series.

The systems and methods of the present teachings also can include a fuel cell system. For example, a closed loop filtration system as described herein can be coupled to a fuel cell system to provide liquid reformable fuel product to a vaporizer of the fuel cell system. The fuel cell system can include a fuel cell stack, which can be in operable fluid communication with a hydrocarbon fuel reformer. The hydrocarbon fuel reformer can be in operable fluid communication with the vaporizer. Downstream from these components, an afterburner can be in operable fluid communication with an exhaust outlet of the fuel cell stack. Known and conventional fuel cells have a variety of types and configurations that include phosphoric acid fuel cells (PAFCs), alkaline fuel cells (AFCs), polymer electrolyte membrane (or proton exchange membrane) fuel cells (PEMFCs), and solid oxide fuel cells (SOFCs).

In various embodiments, a closed loop filtration system for separating and/or enriching light end hydrocarbons from and/or in a mixture of hydrocarbons can include a reservoir to contain a mixture of hydrocarbons; a pump in operable fluid communication with the mixture of hydrocarbons; a filter element, the filter element comprising an inlet in operable fluid communication with the mixture of hydrocarbons from the reservoir, an outlet in operable fluid communication with the reservoir of the mixture of hydrocarbons, and multiple layers of filtration media, where one or more layers of filtration media comprise a size exclusion material; a pressure sensor in operable fluid communication with the filter element; a valve assembly in operable fluid communication with the filter element and with the reservoir of the mixture of hydrocarbon; and a collection chamber enclosing the filter element, the collection chamber comprising an outlet for liquid reformable fuel product enriched in light end hydrocarbons.

FIG. 1A is a schematic diagram of an embodiment of a closed loop filtration system of the present teachings. Referring to FIG. 1A, the closed loop filtration system 10 includes a reservoir 12, a pump 14, a filter element 16, a pressure sensor 18, a valve assembly 20, and a collection chamber 22. The reservoir includes an inlet 24 and an outlet 26, which can be referred to as a reservoir inlet and a reservoir outlet, respectively. The filter element 16 includes an inlet 28 and an outlet 30, which can be referred to as a filter element inlet and a filter element outlet, respectively. The collection chamber 22 includes an outlet 32, which can be referred to as a collection chamber outlet. The closed loop filtration system 10 also includes a first conduit 34 and a second conduit 36. In the depicted filtration system 10, a mixture of hydrocarbons 38 is present in the reservoir 12 and the liquid reformable fuel product 40, for example, hydrocarbons enriched in light end hydrocarbons compared to the mixture of hydrocarbons, are present in the collection chamber 22.

In operation, the pump, such as a liquid or fuel pump, can circulate hydrocarbons through the system. For example, the pump can flow a mixture of hydrocarbons from a reservoir through a filter element (via its inlet and outlet) and back to the reservoir. Examples of a pump such as a liquid or fuel pump include a metering pump, a rotary pump, an impeller pump, a diaphragm pump, a peristaltic pump, a positive displacement pump, a gear pump, a piezoelectric pump, an electrokinetic pump, an electroosmotic pump, and a capillary pump. The pump can control the flow rate of hydrocarbons through the filtration system.

The exemplary filtration system depicted in FIG. 1A includes first and second conduits. A closed loop filtration system of the present teachings can include a plurality of conduits, for example, two or more conduits, positioned to provide operable fluid communication between or among components of the filtration system. A plurality of conduits also can couple a filtration system, for example, at an outlet of a collection chamber, to components of a fuel cell system such as a vaporizer and/or hydrocarbon fuel reformer. That is, the components of the closed loop filtration systems and methods of the present teachings including peripheral components and devices can include conduits connecting or linking the components, for example, a reservoir, a filter element, a collection chamber, a vaporizer, a hydrocarbon fuel reformer, and related equipment such as valve assemblies, pumps, and sensors. Each of these components and others can include one or more of an inlet, an outlet, and a port to permit fluid communication, for example, operable fluid communication, to be established between or among the components. It also should be understood that the conduits can include other components and devices associated therewith, for example, valve assemblies, pumps, and sensors.

The conduits or conduit system can have many specific designs, configurations, arrangements, and connections depending on many factors, for example, the particular application, the starting mixture of hydrocarbons, the liquid reformable fuel product, and the footprint size of the overall filtration and/or fuel cell system. Thus, the conduit systems described and/or shown herein are merely for illustrative purposes and are not meant to limit the present teachings in any way. Moreover, where two or more conduits may be described as connected to, coupled to, or otherwise joining a component or components, for example, a valve assembly and a source of gaseous reformable fuel, a single conduit also can be envisioned as achieving the same design and/or purpose, where the component such as a valve assembly can be described as being "in-line with," "situated within," or "associated with" a single conduit.

After a mixture of hydrocarbons is drawn from a reservoir, the mixture of hydrocarbons can be flowed through the core channel of a filter element. Depending on the design and materials of construction of the filter element and in particular, the layers of filtration media, certain hydrocarbons can be absorbed into the layers of filtration media and/or forced into the layers of filtration media by the fluid pressure in the closed loop filtration system. The hydrocarbons and other components that pass through a core support, if present, and into the layers of filtration media, can be filtered, separated and/or purified from undesired components in the mixtures of hydrocarbons by the use of appropriate components and materials in the layers of filtration media.

For example, the layers of filtration media can include materials or media having porosities such as a size exclusion material. At least one of the layers of filtration media can include a size exclusion material. The size exclusion material can be designed to permit light end hydrocarbons and smaller- or similar-sized compounds to pass through the size exclusion material while larger compounds readily will not pass and can return to the mixture of circulating hydrocarbons depending on the placement of the size exclusion material in the layers of filtration media.

The layers of filtration media and in particular the innermost or first layer of filtration media adjacent to the core channel (and core support, if present) can include a wicking material or media. A wicking material can assist in the absorption and/or transport of hydrocarbons into the layers of filtration media. To that end, the wicking material can be in fluid communication with the core channel to pick-up or absorb certain circulating hydrocarbons. The wicking material typically acts via capillary action and particularly, when a thermal gradient is present. Consequently, a wicking material also can assist in the separation of hydrocarbons and other components in the mixtures to be filtered. The wicking material can be a fibrous material such as a felt or wool material.

Layers of filtration media can contain the same or different materials and/or components for the separation, filtration and/or purification of the mixture of hydrocarbons depending on the specifications desired for the liquid reformable fuel product. For example, one or more layers of filtration media can include a wicking material; a size exclusion material; activated carbon, carbon nanotubes and/or other high surface area carbon-based materials; a metal removal component; a sulfur removal component; and/or a hydrophobic media. A layer of filtration media can include one or more of the different materials and components described herein. For example, a size exclusion material such as a zeolite can include a sulfur removal component associated with, coated and/or impregnated on, and/or loaded in the zeolite. It should be understood that a layer or layers may be present in the layers of filtration media that do not contain filtration media or the filtration media specified herein, for example, a layer useful as a spacer and/or for some other purpose. Such a design and construction of a filter element falls within the scope of the present teachings. These and other features of a filter element of the present teachings will be discussed in more detail below.

Because the mixture of hydrocarbons can be circulating continuously in operation, much of the circulating mixture of hydrocarbons will pass through the core channel and exit the filter element through its outlet and be returned to the reservoir of the starting mixture of hydrocarbons. Where light end hydrocarbons are transported into the layers of filtration media, the circulating mixture of hydrocarbons that is returned to the reservoir usually will have a higher proportion of heavy end hydrocarbons and sulfur. However, this latter fraction of circulating hydrocarbons will be returned and added to the mixture of hydrocarbons already in the reservoir and can be recirculated through the filtration system. In various designs of systems of the present teachings, a secondary reservoir or tank (and optionally additional reservoirs or tanks) can be used to collect the mixture of hydrocarbons exiting the filter element prior to returning to the primary reservoir.

Returning to the hydrocarbons that are taken up by, introduced and/or transported into the layers of filtration media, the fractions of hydrocarbons that pass through the layers of filtration media and exit the filter element, for example, through an exterior surface of the filter element, can be enriched in light end hydrocarbons and/or have a reduced content of sulfur and sulfur-containing compounds and/or other impurities. Such fractions of hydrocarbons that exit an exterior surface of the filter element can be considered the liquid reformable fuel product.

The liquid reformable fuel product can be collected in a collection chamber. The collection chamber can encompass the filter element. The collection chamber can encompass the filter element except for the filter element inlet and the filter element outlet. In such designs, the liquid reformable fuel product can exit, for example, drip or stream out of, an exterior surface of the filter element (rather than exit through the filter element outlet) and be collected in the base of collection chamber. The base of the collection chamber can have an outlet, where the outlet can permit the liquid reformable fuel product to be delivered directly for use or to another container for storage.

The residence time for a particular fraction of hydrocarbons such as a liquid reformable fuel product to pass through the layers of filtration media can be modified by adjusting the flow rate of hydrocarbons through the filtration system and/or the temperature of the circulating hydrocarbons, which also can include the hydrocarbons passing through a filter element. To that end, a pump can be adjusted to modify the flow rate. A valve assembly also can be adjusted to modify the flow rate. For example, a valve assembly including a proportional valve can be adjusted whereby reducing an orifice of the proportional valve can increase the effective pressure of the closed loop filtration system, pressurizing and driving hydrocarbons through the layers of filtration media to the external surface of the filter element. A heater can be used to adjust the temperature of a mixture of hydrocarbons and/or circulating hydrocarbons.

Because the filtration process can be pressure driven, a pressure sensor can be included in the filtration system, for example, before the filter element and collection chamber. The pressure sensor can monitor, measure and/or determine the pressure (e.g., back pressure) of the filtration system so that appropriate adjustment of the pump and valve assembly can provide the desired residence time for the hydrocarbons in the filtration system.

Generally, one or more sensors can be used for monitoring and controlling one or more operations of a filtration system. A sensor can include any suitable sensor devices for the operating parameter being monitored, measured and/or determined. For example, fuel flow rates can be monitored with any suitable flow meter, pressures can be monitored with any suitable pressure-sensing or pressure-regulating device, and temperatures can be monitored with any suitable thermocouple or thermometer. Accordingly, a sensor can include a pressure sensor, a flow sensor, a temperature sensor, and combinations thereof. Examples of sensors include flow meters, pressure meters, thermocouples, thermistors, and resistance temperature detectors. A sensor or sensing device can include a balance, a weighing scale such as a spring scale, or other device for measuring, determining and/or monitoring the weight of an object, for example, a collection chamber.

A filtration system of the present teachings can include a control system for automating the operations of the filtration system. The control system can include a plurality of sensors in communication with a controller. In response to input signals from the sensors, user commands from a user-input device and/or programmed subroutines and command sequences, a controller can manage the operations of a filtration system.

The controller can be software operating on a processor. However, it is within the scope of the present teachings to employ a controller that is implemented with one or more digital or analog circuits, or combinations thereof. In response to input signals from the sensors, user commands from a user-input device and/or programmed subroutines and command sequences, a controller can manage the operations of a filtration system.

The sensors can, but do not necessarily, include a transducer in communication with the controller. The communication pathways will ordinarily be wired electrical signals but any other suitable form of communication pathway can also be employed. For example, the sensors, control signal-receiving devices, and communication pathways herein can be of any suitable construction and of those known in the art. The communication pathways will ordinarily be wired electrical signals but any other suitable form of communication pathway can also be employed.

Figure 1B:
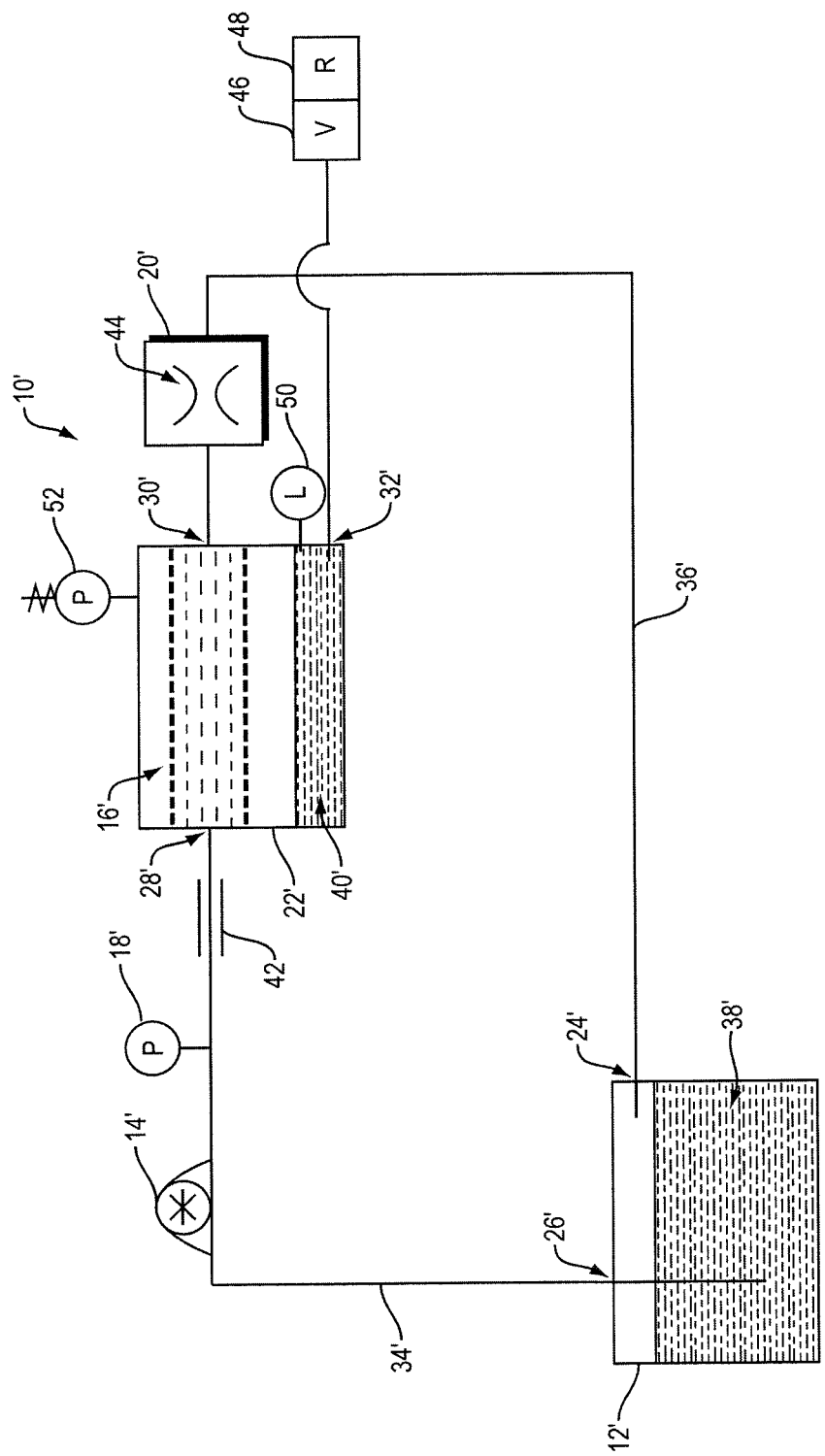
FIG. 1B is a schematic diagram of another embodiment of a closed loop filtration system of the present teachings.

FIG. 1B is a schematic diagram of an embodiment of a closed loop filtration system of the present teachings similar to the filtration system of FIG. 1A but including a heater to adjust the temperature of the mixture of hydrocarbons flowing through the system and a level sensor and a pressure relief valve associated with the collection chamber to determine the level of hydrocarbons collected from the filter element and to control the pressure of the collection chamber, respectively. FIG. 1B also includes a vaporizer coupled to a hydrocarbon fuel reformer of a fuel cell system. The vaporizer can be in operable fluid communication with the interior of the collection chamber via the outlet of the collection chamber. The similar components of FIGS. 1A and 1B can be the same or different, for example, having various modifications associated therewith such as materials of constructions, valve configurations, conduit connections and arrangement, and the like.

Referring to FIG. 1B, the closed loop filtration system 10' includes a reservoir 12', a pump 14', a filter element 16', a pressure sensor 18', a valve assembly 20', and a collection chamber 22'. The reservoir includes an inlet 24' and an outlet 26', which can be referred to as a reservoir inlet and a reservoir outlet, respectively. The filter element 16' includes an inlet 28' and an outlet 30', which can be referred to as a filter element inlet and a filter element outlet, respectively. The collection chamber 22' includes an outlet 32', which can be referred to as a collection chamber outlet. The closed loop filtration system 10' also includes a first conduit 34' and a second conduit 36'. In the depicted filtration system 10', a mixture of hydrocarbons 38' is present in the reservoir 12' and the product hydrocarbons 40', for example, hydrocarbons enriched in light end hydrocarbons compared to the mixture of hydrocarbons, are present in the collection chamber 22'.

The closed loop filtration system of FIG. 1B includes a heater 42, a valve assembly 20' that includes a proportional valve 44, a vaporizer 46 in operable fluid communication with the collection chamber 22' via the collection chamber outlet 32', a hydrocarbon fuel reformer 48 of a fuel cell system operatively coupled to the vaporizer 46, and a level sensor 50 and a pressure relief valve 52 associated with the collection chamber 22'.

In operation, which is similar to that of the filtration system of FIG. 1A and will not be repeated here, a heater of a closed loop filtration system can heat the mixture of hydrocarbons to create temperature gradient from the core channel of the filter element through the layers of filtration media. Heating the mixture of hydrocarbons also can adjust the viscosity of the mixture of hydrocarbons. Changing the viscosity of the mixture of hydrocarbons can impact the fractions of hydrocarbons that can pass through the layers of filtration media of the filter element. If the temperature of the mixture of hydrocarbons is above the boiling point of certain of the light end hydrocarbons in the mixture of hydrocarbons, vapor transfer through the filtration media can occur.

A pressure relief valve or similar valve assembly can be associated with the collection chamber to assist in maintaining and controlling the pressure of the filtration system. The pressure relief valve can permit the pressure to be adjusted to create a gradient of pressure ($\Delta P$) through or across the layers of filtration media of the filter element. A collection chamber also can have other sensors associated therewith such as a level sensor for determining the amount of liquid hydrocarbon fuel product that has been collected and/or remains in the collection chamber.

A collection chamber can have an outlet that can be in fluid communication, for example, operable fluid communication, with a vaporizer. The collection chamber outlet can permit fluid communication such as operable fluid communication between the interior of the collection chamber, for example, accumulated or collected liquid reformable fuel product, and a vaporizer. The vaporizer can be in fluid communication, for example, operable fluid communication, with a hydrocarbon fuel reformer of a fuel cell system. In such a configuration, the closed loop filtration system of the present teachings directly can provide a liquid reformable fuel product to the fuel cell system during its operation.

The collection chamber can include more than one chamber, i.e., be multi-chambered. For example, a portion (or one chamber) of the collection chamber can encompass a filter element. The interior of a chamber encompassing the filter element can be pressurized during operation. Accordingly, the chamber can form an airtight seal about the filter element and associated conduits and other components to maintain an appropriate pressure in the closed loop filtration system. Another portion (or chamber) of the collection chamber can be remote from the portion that encompasses the filter element. The remote portion of the collection chamber can be for collecting and/or accumulating liquid reformable fuel product. The remote portion can be in fluid communication with, for example, operable fluid communication with, the portion encompassing the filter element. Accordingly, the liquid reformable fuel product can be moved or drained away from the portion containing the filter element for direct use and/or storage without the need to maintain the pressure in the remote portion. Valve assemblies, sensors, and conduits can be placed and used appropriately to realize such a design and operation.

In yet another aspect, the present teachings provide a filter element for use in separating and/or enriching light end hydrocarbons from and/or in a mixture of hydrocarbons that can include heavy end hydrocarbons and/or other impurities such as sulfur-containing compounds. The filter element generally is for use in a closed loop system, where pressure in the system can facilitate movement of hydrocarbons through the filter element, for example, from the core channel through the layers of filtration media towards an exterior surface of the filter element. As the hydrocarbons pass through the filter element, the light end hydrocarbons can be separated or filtered from the other components of the circulating hydrocarbon mixture to provide a hydrocarbon fraction enriched in light end hydrocarbons.

Referring now to FIGS. 2A-C, an exemplary embodiment of a filter element of the present teachings is depicted schematically. As shown in FIGS. 2A and 2C, the tubular filter element 16" includes a filter element inlet 28" and a filter element outlet 30" (not seen in FIG. 2A). The layers of filtration media 62, 64, 66, 68 and 70 form concentric layers around a core support 72 that defines a core channel 60 through the filter element 16". The filter element inlet 28"

and the filter element outlet 30″ are at opposite ends of the core channel 60. The innermost layer of filtration media 62 contacts a core support 72.

A filter element generally includes a core channel (passageway) through the interior of the filter element, typically along its longitudinal axis. The lateral cross-section of a core channel can be a variety of shapes such as a circle, a square, a rectangle, a hexagon, an octagon, and the like. For pressure distribution and fluid flow considerations through the layers of filtration media, a circular lateral cross-section often is used. Consequently, the core channel typically is cylindrical in shape.

A filter element has an inlet and an outlet. The filter element inlet can be or can include the upstream end of the core channel. The filter element outlet can be or can include the downstream end of the core channel. In some embodiments, the inlet can include a seal such as a gasket around the inlet. The outlet also can include a seal around the outlet. In such embodiments, the filter element can be designed to be a replaceable component that readily can be removed from a collection chamber and replaced with a fresh filter element, where the seals of the inlet and outlet of the filter element can form a fluid tight fitting with the appropriate ports (e.g., inlet and outlet) of the collection chamber.

The core channel can include or be defined by a core support. The core support can be a polymeric material, for example, a polymeric material that is stable in a hydrocarbon fuel stream. The core support has an exterior surface. The exterior surface can be in contact with an interior surface of the first or innermost layer of filtration media. Where the core is tubular, the exterior surface of the tubular core can be in contact with an interior surface of the first or innermost concentric layer of filtration media.

The core support can include perforations and other passageways therethrough. The perforations and other passageways can provide fluid communication between the core channel (and circulating hydrocarbons, when present) and the layers of filtration media. The perforations can be of any shape and dimension suitable to provide fluid communication between the circulating mixture of hydrocarbons and the layers of filtration media. A more porous core support should generate less back pressure than a less porous core support. Accordingly, the porosity of the core support can be adjusted for a particular application, filtration system, and/or other processing parameters such as flow rate and back pressure.

The design of the filter element in layers, for example, sequential layers such as concentric layers, of filtration media about a hollow core (channel) at the interior of the filter element permits the pressure of the filtration system to move sequentially the hydrocarbons through the layers of filtration media. For example, where a tubular core channel (and core support, if present) is encompassed by concentric layers of filtration media, the pressure of the circulating hydrocarbons against the innermost layer of filtration media (and the core support, if present) can move hydrocarbons from the interior of the core channel into the sequential layers of filtration media. After passage through the layers of filtration media, a liquid reformable fuel product enriched in light end hydrocarbons can exit the filter element at an exterior surface of the filter element (which is not the core channel outlet). The filtration product enriched in fractions of light end hydrocarbons can be collected after exiting the filter element, for example, in a collection chamber.

It should be understood that the filter element does not need to be cylindrical or tubular and can be of other shapes and designs. Moreover, where a core support is used to create a filter element, the layers of filtration media can be present adjacent to the core support but not entirely encompassing it. For example, a rectangular filter element can be positioned adjacent to a core support (or more than one core support) to permit mixtures of hydrocarbons to exit the core support(s) into the layers of filtration media for separation and/or enrichment of light end hydrocarbons from and/or in the mixture of hydrocarbons. In such embodiments, the layers of filtration media do not necessarily define a core channel, but rather the core support can define the core channel and the layers of filtration media are in fluid communication with the core channel through the walls of the core support, for example, through perforations in the core support. In such embodiments, the perforations may not extend around the perimeter or circumference of the core support but can be present only adjacent to the layers of filtration media so as to direct the mixture of hydrocarbons through the layers of filtration media using the internal pressure of the system.

The design and components included in the layers of a filter element can vary depending on the source and contents of the mixture of hydrocarbons to be processed, the particular application for which the product hydrocarbons will be used, and the associated characteristics and specifications for such product hydrocarbons, for example, liquid reformable fuels for use in a fuel cell system. Thus, the following description of materials and components of a layer or layers of filtration media of a filter element should be considered exemplary and non-limiting as to whether one or a combination of such materials and components are essential to the practice of the present teachings.

As stated previously, layers of filtration media can contain the same or different materials and/or components, including two or more materials and/or components, for example, in combination, for the separation, filtration and/or purification of a mixture of hydrocarbons. For example, the innermost layer of filtration media can include a wicking material and a size exclusion material. Certain components and materials of the filtration media can be impregnated and/or coated on, loaded in, or otherwise associated with other materials in a layer of filtration media. For example, where a carbon fiber such as a carbon fiber weave, an aluminum felt or other appropriately stable porous or fibrous supports are used in a layer of filtration media, these materials can be impregnated, coated and/or associated with a wicking material, a size exclusion material, activated carbon, carbon nanotubes and other nano-scale carbon-based materials, a sulfur removal component, a metal removal components, and/or a hydrophobic material.

In various embodiments, the innermost layer of filtration media, i.e., the layer of filtration media adjacent the core channel (or core support, if present) of the filter element, for example, in contact with the exterior surface of the core support, can include a wicking material to facilitate transport and/or absorption of the hydrocarbons into the filter element. The wicking material can be selective for, for example, preferential for, light end hydrocarbons over high end hydrocarbons. The wicking material can be a felt or felt-like material. The wicking material can be a ceramic fiber such as a refractory ceramic fiber. Examples of wicking materials include kao wool, Saffil (alumina) fibers and materials, and a high-temperature insulation wool. The wicking material can be a carbon fiber weave.

In particular embodiments, one or more layers of filtration media of a filter element include a size exclusion material. The size exclusion material can be designed to permit light end hydrocarbons and smaller or similar-sized compounds to pass through the size exclusion material while larger compounds readily will not pass and can return to the mixture of circulating hydrocarbons depending on the placement of the size exclusion material in the layers of filtration media. Examples of size exclusion materials include macroporous polymeric materials that are stable in the chemical and operating environment of the filtration system, carbon nanotubes, alumina, zeolites, and activated carbon (from various sources, e.g., vegetal sources). Such materials are available in various forms. When the size exclusion material is particulate, packing such materials can produce appropriately-sized pore dimensions and structure useful in the present teachings.

In some embodiments, one or more layers of filtration media of a filter element include high surface area carbon-based materials such as activated carbon, carbon nanotubes and/or carbon fibers, for example, a carbon fiber weave. The properties and benefits of using activated carbon in the filtration media of the present teachings are well known and will not be repeated here. Nevertheless, it should be understood that the activated carbon and other high surface area carbon-based materials for use in the layers of filtration media can take untraditional forms such as being impregnated within or on, coated on, or otherwise associated with a carbon fiber weave. That is, a carbon fiber weave or other structural support such as an aluminum felt or refractory ceramic fibers can include, for example, nano-scale materials associated therewith, such as coated and/or impregnated therein and/or thereon. A high surface area carbon-based material can have one or more other materials and/or components coated and/or impregnated on, or associated with, the high surface area carbon-based material.

Other useful structural filtration media that can be used include an aluminum felt, which can be a structured textiled material. An aluminum felt can be infiltrated and/or impregnated with an activated carbon, carbon nanotubes, and/or a carbon nano-scale material.

In particular embodiments, one or more layers of filtration media can include a sulfur removal component suitable for the reduction, removal and/or extraction of sulfur and sulfur-containing compounds such as sulfur-containing compounds. The sulfur removal component can be a metal such as cerium, cobalt, copper, iron, nickel, or titanium, including oxides, sulfides and other forms thereof, and combinations thereof. The sulfur removal component can be a Group 6 metal such as chromium, molybdenum and tungsten, including oxides, sulfides and other forms thereof, and combinations thereof including with other sulfur removal components.

As with other components of the layers of filtration media, a sulfur removal component can be supported on another material or substrate within the layer of filtration media, for example, on or within a zeolite, activated carbon, and/or other solid materials that can be present in other layers of filtration media. A sulfur removal component can be supported on or form part of a metal-organic framework ("MOF").

In particular embodiments, the sulfur removal component can be present only in one or more of the outer or peripheral layer or layers of the filter element, for example, the outermost layer of the layers of filtration media. Such a design can permit the other layers of filtration media to reduce the level or content of sulfur and sulfur-containing compounds in the hydrocarbons moving through the layers of filtration media prior to contacting the sulfur removal component thereby to increase the useful life of the sulfur removal component.

In some embodiments, one or more layers of filtration media can include a hydrophobic material suitable for the reduction, removal and/or extraction of water from the hydrocarbon fraction moving through the layers of filtration media. The hydrophobic material can be particles, a membrane, or a film. The placement of the hydrophobic materials can vary; however, placement closer to the interior of the layers of filtration media can prevent water from entering and/or accumulating in the layers of filtration media. Examples of hydrophobic materials include materials used as hydrophobic filters such as fluorocarbons, for example, polytetrafluoroethylene ("PTFE"), and silicones.

In various embodiments, one or more layers of filtration media can include a metal removal component suitable for the reduction, removal and/or extraction of metals and metal-containing impurities that may be present in the mixture of hydrocarbons.

A filter element can be made by forming a first or innermost layer of filtration media into the desired shape, for example, the cross-sectional shape of a core channel. The filtration media can be in sheet form such that forming a core channel can include rolling and securing the sheet of filtration media to form a cylindrical tube. Second and additional layers of filtration media, in sheet form, can be formed around and secured to the first layer of filtration media and so on until the final filter element with its sequential layers of filtration media is realized. A porous skin, sheath, film, or other coating material can be formed on and/or encompass the entire filter element except for the filter element inlet and the filter element outlet. Such a protective coating can add structural support to the filter element and maintain the integrity of the layers of filtration media. Carbon fiber weaves and other porous materials can be used for this purpose.

Alternatively or in addition to the use of sheet forms of filtration media, a layer of filtration media can be formed by other methods known in the art, for example, spray drying a slurry of a material, for example, a slurry of activated carbon, on to the prior layer of filtration media. Afterwards, a sheet or other wrap of material can be formed around the spray-dried material to create a layer of filtration media. A sheet or wrap of material can be placed in contact with, for example, formed around, encompassing or surrounding, the exterior surface of the layer of filtration media to which a spray-dried or otherwise-deposited material is to be applied. The sheet or wrap can assist in maintaining the placement and/or structural integrity of the spray-dried or otherwise-deposited materials.

Regardless of the layer of filtration media and its method of inclusion in a filter element, a sheet or wrap can maintain a layer of filtration media distinct from other layers of filtration media and prevent the materials in a particular layer from migrating through the layers of filtration media during operation. Such a sheet or wrap can be used in contact with, for example, formed around, encompassing or surrounding, any of the (e.g., exterior surfaces of the) layers of filtration media described herein such as the outermost layer of filtration media, which design can provide a filter element with additional structural integrity. The sheet or wrap can be a porous material, for example, a chromatographic paper or Saran™ Filter Cloth, such that the hydrocarbons can pass through the layers of filtration media.

In some embodiments, a core support can be used. For cross-sectional shapes other than a circle, use of a core support can simplify the process. As discussed above, filtration media in sheet form can contact and form a first layer about the core support. Alternative methods of depositing layers of filtration media also can be used, for example, spray drying. When a core support is used, such alternate methods can be used to create the first layer of filtration media as the core support provides the foundation for the first layer of filtration media. The use of a core support can permit the use of a vacuum when forming the layers of filtration media. For example, a vacuum can be pulled from the interior of the core support to pack more tightly the filtration media, whether provided in sheet form or provided otherwise such as by spray drying.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A closed loop filtration system for separating and/or enriching light end hydrocarbons from and/or in a mixture of hydrocarbons, the system comprising:
    a reservoir to contain a mixture of hydrocarbons, wherein the reservoir comprises an inlet and an outlet;
    a pump to circulate hydrocarbons through the system;
    a filter element, the filter element comprising layers of filtration media, wherein the layers of filtration media define a core channel through the filter element and at least one layer of the layers of filtration media comprises a size exclusion material; an inlet comprising the upstream end of the core channel for receiving a mixture of hydrocarbons from the reservoir, an outlet comprising the downstream end of the core channel for returning circulating hydrocarbons to the reservoir, and an exterior surface in fluid communication with the layers of filtration media;
    a pressure sensor to determine the pressure of circulating hydrocarbons;
    a valve assembly, in operable communication with the pressure sensor, to control the flow of hydrocarbons circulating through the system; and
    a collection chamber in fluid communication with the exterior surface of the filter element, the collection chamber comprising an outlet for liquid reformable fuel product enriched in light end hydrocarbons,
    wherein the inlet of the reservoir is in fluid communication with the outlet of the filter element and the outlet of the reservoir is in fluid communication with the inlet of the filter element.

2. The closed loop filtration system of claim 1, the system comprising a first conduit, the first conduit comprising an upstream end and a downstream end, wherein the upstream end of the first conduit is in fluid communication with the outlet of the reservoir and the downstream end of the first conduit is in fluid communication with the inlet of the filter element.

3. The closed loop filtration system of claim 2, the system comprising a second conduit, the second conduit comprising an upstream end and a downstream end, wherein the upstream end of the second conduit is in fluid communication with the outlet of the filter element and the downstream end of the second conduit is in fluid communication with the inlet of the reservoir.

4. The closed loop filtration system of claim 1, the system comprising a heater in thermal communication with the mixture of hydrocarbons.

5. The closed loop filtration system of claim 1, wherein one or more layers of the layers of filtration media comprises one or more of activated carbon, carbon nanotubes, a wicking material, a metal removal component, a sulfur removal component, and a hydrophobic surface.

6. The closed loop filtration system of claim 5, wherein the sulfur removal component comprises cerium, chromium, cobalt, copper, iron, molybdenum, nickel, titanium, or tungsten, or oxides thereof, or sulfides thereof.

7. The closed loop filtration system of claim 5, wherein the wicking material comprises a felt material and is in fluid communication with the core channel.

8. The closed loop filtration systems of claim 1, wherein the collection chamber encloses the filter element except for the inlet and the outlet of the filter element.

9. The closed loop filtration system of claim 1, wherein the outlet of the collection chamber is in fluid communication with a vaporizer connected to a fuel cell system.

10. The closed loop filtration system of claim 1, wherein the reservoir comprises a mixture of hydrocarbons and the mixture of hydrocarbons comprises light end hydrocarbons and heavy end hydrocarbons.

11. The closed loop filtration system of claim 10, wherein the mixture of hydrocarbons comprises a jet fuel.

12. A method of separating and/or enriching light end hydrocarbons from and/or in a mixture of hydrocarbons, the method comprising:
    circulating a mixture of hydrocarbons in a closed loop system, the closed loop system comprising a filter element, wherein the filter element comprises:
        layers of filtration media, wherein at least one layer of the layers of filtration media comprises a size exclusion material, and the layers of filtration media define a core channel through the filter element whereby the mixture of hydrocarbons circulates through the core channel and hydrocarbons pass through the layers of filtration media,
        an inlet comprising the upstream end of the core channel for receiving a mixture of hydrocarbons from a reservoir, and
        an outlet comprising the downstream end of the core channel for returning circulating hydrocarbons to the reservoir; and
    collecting a liquid reformable fuel product enriched with light end hydrocarbons that passes through and exits the layers of filtration media.

13. The method of claim 12, wherein one or more layers of the layers of filtration media comprises one or more of activated carbon, carbon nanotubes, a wicking material, a metal removal component, a sulfur removal component, and a hydrophobic surface.

14. The method of claim 12, comprising flowing the liquid reformable fuel product enriched with light end hydrocarbons to a vaporizer.

15. The method of claim 12, further comprising reducing the level of at least one of a sulfur compound and a metal in the mixture of hydrocarbons to provide a liquid reformable fuel product enriched with light end hydrocarbons and having a reduced content of sulfur and/or the metal than in the mixture of hydrocarbons.

16. A tubular filter element for use in a closed loop system for separating and/or enriching light end hydrocarbons from and/or in a mixture of hydrocarbons, the filter element comprising:

concentric layers of filtration media, wherein the concentric layers of filtration media define a core channel through the filter element, and at least one layer of the concentric layers comprises a size exclusion material;

an inlet comprising the upstream end of the core channel; and an outlet comprising the downstream end of the core channel;

whereby the mixture of hydrocarbons can flow through the filter element from the inlet to the outlet and hydrocarbons can pass through the concentric layers of filtration media and be collected as a liquid reformable fuel product enriched with light end hydrocarbons.

17. The filter element of claim 16, wherein the filter element comprises a tubular core support, wherein the exterior surface of the tubular core support is associated with the internal surface of the innermost concentric layer of filtration media.

18. The filter element of claim 16, wherein at least one layer of the concentric layers of filtration media comprises one or more of a wicking material, activated carbon, carbon nanotubes, a metal removal component, a sulfur removal component, and a hydrophobic surface.

19. The filter element of claim 18, wherein the wicking material is in fluid communication with the core channel, and the wicking material comprises a felt material.

* * * * *